Aug. 22, 1933.　　　　　G. M. KRAG　　　　　1,923,100

BROILING APPARATUS

Filed Aug. 29, 1930　　　　2 Sheets-Sheet 1

INVENTOR:
Grace Mann Krag
By E. J. Andrews
Atty.

Aug. 22, 1933.  G. M. KRAG  1,923,100
BROILING APPARATUS
Filed Aug. 29, 1930   2 Sheets-Sheet 2

INVENTOR:
Grace Mann Krag
By E J Andrews
Atty

Patented Aug. 22, 1933

1,923,100

UNITED STATES PATENT OFFICE 1,923,100

BROILING APPARATUS

Grace Mann Krag, Chicago, Ill.

Application August 29, 1930. Serial No. 478,578

5 Claims. (Cl. 53—5)

This invention relates to broiling apparatus and has for its object providing suitable grill means for holding meat which is to be grilled and a suitable pan for coacting with said grill means. A further object of the invention is to provide suitable devices for manipulating the apparatus.

Figure 1:
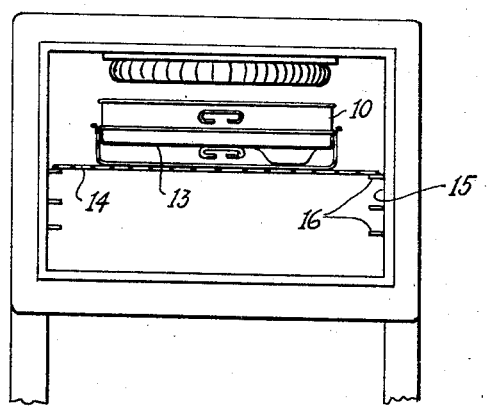
Figure 3:
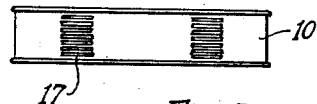
Figure 4:
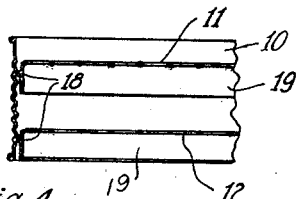
Figure 2:
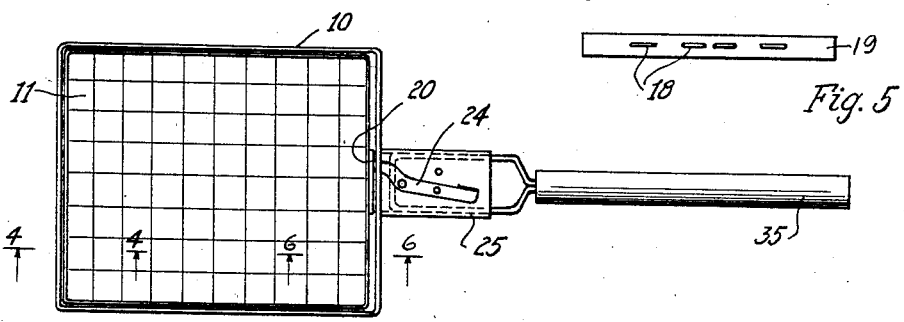
Figure 5:
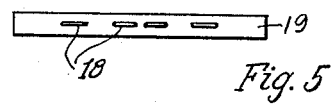
Figure 6:
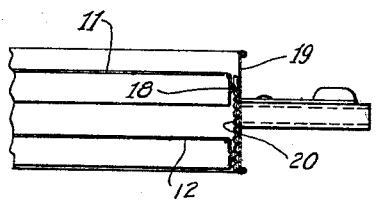
Figure 7:
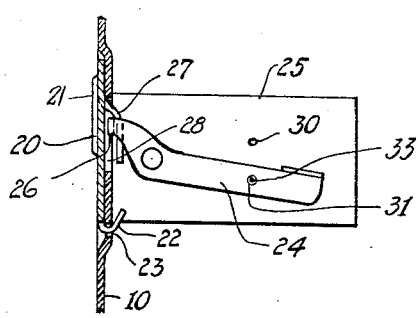
Figure 8:
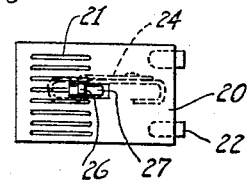
Figure 9:
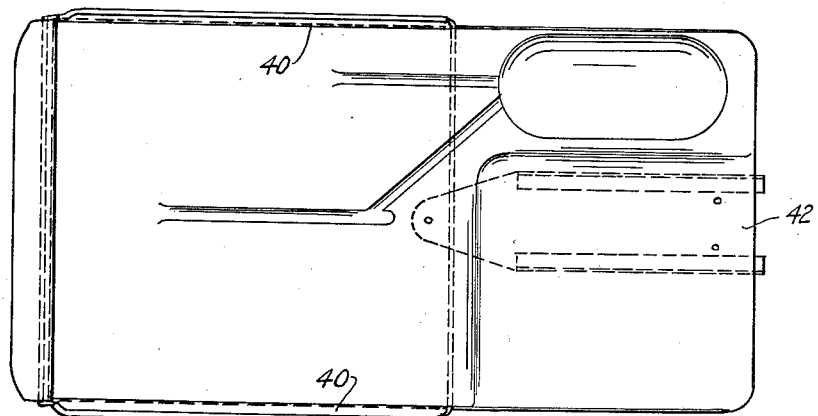
Figure 10:
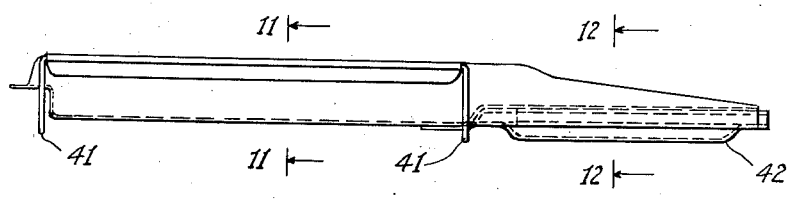
Figure 11:
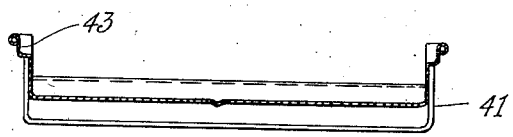
Figure 12:
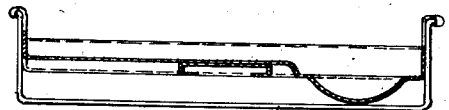

Of the accompanying drawings, Fig. 1 is an elevation of an oven and broiling means therein which embody features of my invention; Fig. 2 is an enlarged plan view of the apparatus with the handle attached; Fig. 3 is an elevation of the rear end of the grill frame; Fig. 4 is an enlarged sectional view along the line 4—4 of Fig. 2; Fig. 5 is an end elevation of a grill frame; Fig. 6 is a sectional view along the line 6—6 of Fig. 2; Fig. 7 is an enlarged plan view of the handle socket of the grill frame; Fig. 8 is an elevation of the grill locking plate; Fig. 9 is an enlarged plan view of the broiler pan; Fig. 10 is a side elevation of the same; Fig. 11 is a sectional view along the line 11—11 of Fig. 10; and Fig. 12 is a sectional view along the line 12—12 of Fig. 10.

The broiling apparatus which I have illustrated comprises a rectangular frame or casing 10 which has sides consisting of metal. The grills 11 and 12 are supported in any suitable manner in the frame 10. In use, the frame and grills are supported on a pan 13 as near the fire as may be desired, and the meat to be broiled is placed between the two grills. Preferably, the pan is supported by the ordinary oven grill 14 which may be adjustably supported in the oven 15 by means of supports 16.

The grills 11 are adjustably supported in the frame 10, preferably by means of corrugations 17 formed in the rear end of the frame, which coact with corrugations 18 in the ends of the frames 19 to which are fixed the grills 11 and 12. The two grills 11 and 12 and the frame pieces 19 of the grills are similar and interchangeable, so that it is unnecessary to determine which grill or end goes in a particular place. Also, either side may be upward.

The forward ends of the grill frames also have corrugations 18 similar to those at the rear end, and the grills are held in their adjusted positions by means of a plate 20 having corrugations 21 thereon arranged to coact with the inner corrugations 18 of the frames 19. This plate 20 is pivoted to the frame 10 in any suitable manner, such as by means of the lugs 22 passing through openings 23 in the frame 10, and the plate 20 is operated by means of a cam 24 pivoted to a socket 25. The inner end of this cam is formed so as to press against the plate 20 as the outer end of the cam is raised, Fig. 7, so as to cause the corrugations 21 to coact with the corrugations 18 of both of the grill frames and, thus, to hold the frames rigidly in position.

In order to withdraw the plate 20 from coaction when the cam is released, a lug 26 is fixed to the inner end of the cam, which acts upon a tongue 27 projecting from the plate 20 through an opening 28 in the end of the frame 10. As the cam is released from the plate by forcing downwardly the outer arm, the lug 26 coacts with the tongue 27 and pulls the plate 20 outwardly against the frame 10.

In order to lock the cam in its operating position, a tit 30 is provided on the socket 25 arranged so that, when the cam arm is pushed into its folding position, the tit will co-operate with an opening 31 in the arm and hold it in its locked position. On the other hand, a tit 33 is provided which coacts with the opening 31 when the cam is operated, so as to withdraw the plate 20 from coaction with the grill frames.

The frame 10 may be manipulated by means of a handle 35 which is adapted to slip into the socket 25. By means of this handle, the frame 10 supporting the grills may be removed from the oven and inverted and restored to operating position when desired. Two sockets may be fixed to the end of the frame and two handles may be used, if desired.

The pan 13 which supports the grill frame 10, when in operation, has a flange 40 projecting inwardly along each inner side, upon which the frame 10 rests when in operation. The pan also has legs 41 which support the pan on the oven grill 14. The pan also has a socket 42 for receiving the handle 35, so that the pan may be conveniently manipulated by means of the same handle with which the grill frame is manipulated. The pan is supplied with side walls 43, so that any drippings from the meat is prevented from spattering out, the side walls of the frame 10 and of the pan 13 telescoping so as to prevent any leakage of the grease.

It will thus be seen that I have provided a broiling apparatus, comprising a pair of grills for holding the meat to be broiled, which can be adjusted in position in a frame, so that the grills may be substantially in contact or separated so far as may be desired, and that this adjustment may be made very conveniently and quickly.

I also provide a handle for manipulating the grills when it is desired to remove them or invert them. The grills may be removed simply by inverting the supporting frame and releasing the plate 20. The grills will then fall out of the frame. I also provide a pan for supporting the grill frame, with its walls substantially continuous with the walls of the frame, so that there is no spattering of the grease possible, and have provided means for manipulating the pan by the same handle as is used for the grill frame.

I claim as my invention:

1. Grilling apparatus comprising an enclosing frame and two grill plate frames mounted in said enclosing frame, means for holding said grill plate frames in adjusted positions in said enclosing frame, said means comprising a holding plate mounted between one end of said enclosing frame and the adjacent ends of said grill plate frames, said holding plate being pivotally associated with said enclosing frame, and means for forcing said holding plate inwardly against said grill plate frames.

2. Grilling apparatus as claimed in claim 1, in which said latter means is also adapted to force said holding plate away from said grill plate frames.

3. Broiling apparatus comprising an enclosing frame, two grill plates mounted in said frame, and means for locking both of the grill plates in adjusted positions, said means comprising a single member for locking both grills, said locking means comprising a plate mounted in one end of said frame and cam means for forcing said plate against the adjacent end of each of the grill plates.

4. Broiling apparatus comprising an enclosing frame, two grill plates mounted in said frame, and means for locking both of the grill plates in adjusted positions, said means comprising a single member for locking both grills, said locking means comprising a plate mounted in one end of said frame and cam means for forcing said plate against and away from said grill plates.

5. Broiling apparatus as claimed in claim 4, including means for locking said cam with the plate in either position.

GRACE MANN KRAG.